United States Patent
Wan et al.

(10) Patent No.: US 7,029,613 B2
(45) Date of Patent: *Apr. 18, 2006

(54) METHOD OF FORMING SILICON CARBIDE AND SILICON NITRIDE COMPOSITE

(75) Inventors: Julin Wan, Schenectady, NY (US); Matthew J. Gasch, Sacramento, CA (US); Amiya K. Mukherjee, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/658,126

(22) Filed: Sep. 8, 2003

(65) Prior Publication Data

US 2004/0179969 A1    Sep. 16, 2004

Related U.S. Application Data

(60) Provisional application No. 60/441,897, filed on Jan. 21, 2003.

(51) Int. Cl.
  *B22F 1/00*    (2006.01)
  *C04B 35/52*    (2006.01)

(52) U.S. Cl. ............... 264/123; 264/125; 264/332; 264/682; 264/683

(58) Field of Classification Search ............... 264/405, 264/332, 430, 434, 682, 683, 123, 125; 501/91–93
See application file for complete search history.

(56) References Cited

U.S. PATENT DOCUMENTS

| | | | |
|---|---|---|---|
| 3,968,194 A * | 7/1976 | Prochazka | 264/122 |
| 4,184,882 A | 1/1980 | Lange | |
| 4,800,182 A | 1/1989 | Izaki et al. | |
| 5,134,097 A * | 7/1992 | Niihara et al. | 501/92 |
| 5,376,599 A | 12/1994 | Oshima et al. | |
| 5,523,267 A | 6/1996 | Tanaka et al. | |
| 5,541,143 A | 7/1996 | Hirosaki et al. | |
| 5,914,286 A * | 6/1999 | Collin et al. | 501/97.4 |
| 6,133,180 A * | 10/2000 | Miyake et al. | 501/92 |

OTHER PUBLICATIONS

Gasch, Matthew J., et al.; "Creep of Silicon Nitride/Silicon Carbide Ceramic Nanocomposites"; *The Minerals, Metals & Materials Society* 2002 pp. 247-256.
Gasch, Matthew J., et al.; "Preparation of $Si_3N_4$/SiC nanocomposite by high-pressure sintering of polymer precursor derived powders"; *Scripta Materialia* 2001 pp. 1063-1068 vol. 45.
Niihara, Koichi et al.; "Nanostructure and Thermomechanical Propties of $Si_3N_4$/SiC Composites Fabricated from Si-C-N Precursor Powders"; *J. Japan Soc. Powder and Powder Metall* 1989 pp. 169-172 vol. 36.
Rendtel, Andreas et al.; "Silicon Nitride/Silicon Carbide Nanocomposite Materials: II, Hot Strength, Creep, and Oxidation Resistance"; *J. Am. Ceram. Soc.* 1998 pp. 1109-1120 vol. 81 No. 5.
Wan, Julin et al.; "Consolidation and crystallization of $Si_3N_4$/SiC nanocomposites from a poly(urea-silazane) ceramic precursor"; *J. Mater. Res.* 2001 pp. 3274-3286 vol. 16 No. 11.
Wan, Julin et al.; "In Situ Densification Behavior in the Pyrolysis Consolidation of Amorphous Si-N-C Bulk Ceramics from Polymer Precursors"; *J. Am. Ceram. Soc.* 2001 pp. 2165-2169 vol. 84 No. 10.
Wan, Julin et al.; "Processing and Properties of Ceramic Nanocomposites Produced from Polymer Precursor Pyrolysis, High Pressure Sintering and Spark Plasma Sintering"; *Mat. Res. Soc. Pro.* 2001 pp. B7.2.1-B7.2.5 vol. 634.
Wan, Julin et al.; "Effect of Ammonia Treatment on the Crystallization of Amorphous Silicon-Carbon-Nitrogen Ceramics Derived from Polymer Precursor Pyrolysis"; *J. Am. Ceram. Soc.* 2002 pp. 554-564 vol. 85 No. 3.
Wan, Julin et al.; "Nano—Nano Composites of Silicon Nitride and Silicon Carbide"; *Department of Chemical Engineering and Materials Science, University of California Davis* 2002 pp. 235-244.
Wan, Julin et al.; The Creep Behavior of $Si_3N_4$/SiC Nanocomposites; *JOM* 2003 pp. 28-33.
Wan, Julin et al.; "Silicon Nitride-Silicon Carbide Nanocomposites Fabricated by Electric-Field-Assisted Sintering"; *J. Am. Ceram. Soc.* 2003 pp. 526-528 vol. 86 No. 3.
Wan, Julin et al.; "Silicon Nitride/Silicon Carbide Nanocomposites from Polymer Precursor"; *Department of Chemical Engineering and Materials Science, University of California Davis* pp. 665-672, 2002.

* cited by examiner

*Primary Examiner*—Steven P. Griffin
*Assistant Examiner*—Carlos Lopez
(74) *Attorney, Agent, or Firm*—M. Henry Heines; Townsend and Townsend and Crew, LLP

(57) ABSTRACT

Densified composites of silicon nitride and silicon carbide that exhibit high creep resistance are obtained by mechanically activating a mixture of amorphous powders of silicon nitride and silicon carbide and sintering the mechanically activated mixture in the presence of an electric field under high pressure. The grain size in the resulting composite is less than 100 nanometers for all components of the composite, and the composite exhibits high creep resistance.

13 Claims, No Drawings

METHOD OF FORMING SILICON CARBIDE AND SILICON NITRIDE COMPOSITE

CROSS REFERENCE TO RELATED APPLICATION

This application is related to, and claims benefit from, co-pending U.S. Provisional Patent Application Ser. No. 60/441,897, filed Jan. 21, 2003. The contents of the aforesaid provisional patent application are hereby incorporated herein by reference for all purposes capable of being served thereby.

STATEMENT AS TO RIGHTS TO INVENTIONS MADE UNDER FEDERALLY SPONSORED RESEARCH AND DEVELOPMENT

This invention was made with United States Government support under Contract No. N00014-00-1-0186, awarded by the Office of Naval Research. The Federal Government has certain rights in this invention.

BACKGROUND OF THE INVENTION

1. Field of the Invention

This invention lies in the field of composites of silicon nitride and silicon carbide, and relates in particular to methods for preparing these composites as materials of high relative density, high strength, and high creep resistance.

2. Description of the Prior Art

Composites of silicon nitride and silicon carbide have been widely investigated as materials for load-carrying structural components that require strength and toughness and that can withstand high temperatures. The high strength and toughness of these composites, particularly at high temperatures, as well as their high oxidation resistance, have been attributed to the silicon carbide component, while the silicon nitride component limits the thermal expansion of the composite to a low value. These characteristics are highly desirable for a wide variety of applications extending from microelectromechanical devices (MEMS) to materials of construction for high-stress equipment such as heat engines, cutting tools, wear and friction surfaces, and space vehicles. These qualities are attributable to several factors, prominent among which are the density and microstructure of the composite. The strength of the composite, for example, increases with the relative density.

A property of these composites that has been difficult to control in the prior art is creep resistance. Reports of the effect of the inclusion of silicon carbide on the creep resistance have indicated inconsistent results, and it is believed that the inability to control creep resistance has been due at least in part to efforts for achieving high relative density.

Prior art methods for preparing dense silicon nitride/silicon carbide composites typically involve the consolidation and densification of powder mixtures of silicon nitride and silicon carbide. The typical consolidation and densification methods are hot-pressing, gas-pressure sintering, and hot isostatic pressing. The composites produced by these methods generally have microstructures consisting of micron-sized or sub-micron-sized grains of both silicon nitride and silicon carbide crystals with inclusions of nano-sized crystals of silicon nitride dispersed through the micron-sized or sub-micron-sized grains. The term "micron-sized" refers to grains having diameters that are greater than 1 micron, "sub-micron-sized" refers to grains having diameters within the range of 100 nm to 1,000 nm, preferably 150 nm or above, and "nano-sized" refers to grains whose diameters are less than 100 nm, particularly 50 nm or below. To increase the degree of densification that occurs during these procedures, densification aids have been used, notably metal oxides that are liquid at the sintering temperature. Examples of such metal oxides are magnesium oxide (MgO), alumina ($Al_2O_3$), yttria ($Y_2O_3$), lithium oxide ($LiO_2$), and rare earth oxides such as ceria ($CeO_2$). Alumina, yttria, or a combination of alumina and yttria are most often used.

While the metal oxides improve the density of the product, they tend to interact with the silicon oxide ($SiO_2$) films that are often present on the surfaces of the powder particles. These films are typically formed as a residue of the nitridation reaction by which the silicon nitride powder is produced from silicon starting material. Once formed, the silicon oxide films interact with an alumina or yttria densification aid to produce an oxy-nitride glass at the interfaces between the silicon nitride and silicon carbide particles. The glass melts at a temperature lower than the melting temperature of either silicon nitride or silicon carbide. This lowers the creep resistance of the final, densified product. Starting powder mixtures that are prepared by methods other than the nitridation of silicon also suffer from a measurable creep rate when a metal oxide is used for densification, since the metal oxide itself demonstrates glassy phase behavior.

The present invention seeks to address these problems by providing a method for producing a highly dense silicon nitride/silicon carbide composite with a creep rate that is either very low or below the measurement limits of current creep testing equipment.

SUMMARY OF THE INVENTION

It has now been discovered that composites of silicon nitride and silicon carbide can be densified to a high degree, comparable to that obtained with the metal oxide densification aids of the prior art, by a process that involves either no densification aid or a much reduced amount of densification aid, to achieve a product that sharply reduces or eliminates the degradation in creep behavior observed in composites of the prior art. This result is achieved by forming an amorphous mixture of silicon nitride and silicon carbide powders in an inert environment, subjecting the mixture to mechanical activation by high-energy ball milling, then consolidating and densifying the powder mixture by compressing the mixture while passing an electric current through it, to achieve a fused mass of silicon nitride and silicon carbide crystals. The consolidation and densification are preferably done by electric field-assisted sintering, also known as spark plasma sintering. The process results in a composite whose microstructure consists of nano-sized silicon nitride grains and nano-sized silicon carbide grains, with essentially no glassy phase or a glassy phase of such small proportions that it does not contribute significantly to the creep behavior of the composite. The composite thus has the highest creep resistance as a function of temperature and stress reported so far. These and other objectives, features, and advantages of the invention will be apparent from the description that follows.

DETAILED DESCRIPTION OF THE INVENTION AND PREFERRED EMBODIMENTS

While any silicon nitride and silicon carbide powders of the appropriate particle size can be used in the practice of this invention, one means of obtaining such a powder mixture is by the pyrolysis of any of a variety of polymeric precursors that contain silicon, carbon, and nitrogen. The conversion of these precursors to powder mixtures is preferably achieved by first crosslinking the polymer, then pyrolyzing the crosslinked polymer to an amorphous solid of silicon, carbon and nitrogen, and finally comminuting the amorphous solid to a powder consisting of particles in the micron-size, sub-micron-size, or nano-size range, preferably less than 100 nanometers in diameter. These steps are preferably performed in an inert atmosphere such as nitrogen, argon, or any non-oxidizing gas to avoid or minimize the presence or formation of silicon dioxide.

Examples of suitable polymeric precursors are polyorganosilazanes. Descriptions of polyorganosilazanes and of the crosslinking and pyrolysis methods are found in the following United States patents, each of which is incorporated herein by reference in its entirety:

Schwark (Hercules Incorporated, assignee), U.S. Pat. No. 4,929,704, issued May 29, 1990

Schwark (Hercules Incorporated, assignee), U.S. Pat. No. 5,001,090, issued Mar. 19, 1991

Schwark (Hercules Incorporated, assignee), U.S. Pat. No. 5,021,533, issued Jun. 4, 1991

Schwark (Hercules Incorporated, assignee), U.S. Pat. No. 5,032,649, issued Jul. 16, 1991

Schwark (Hercules Incorporated, assignee), U.S. Pat. No. 5,155,181, issued Oct. 13, 1992

Further descriptions are found in the following publications available on the Internet at www.kioncorp.com, each of which is also incorporated herein by reference:

"KiON™ Polysilazanes—Hybrid Inorganic/Organic Resin Systems," KiON Corporation, New York, N.Y., USA, Apr. 2, 2001

"KiON™ VL20 and CERASET™ Liquid Polysilazanes—General Technical Bulletin," KiON Corporation, New York, N.Y., USA, Apr. 2, 2001

These polymers are liquid and are generally characterized by repeat units with alternating silicon and nitrogen atoms. Some of these polymers further contain urea or thiourea functionalities in the repeat units, and in some cases the repeat units or the polymers themselves are cyclic while in others they are not cyclic. One preferred polysilazane is CERASET™ SN, whose formula is shown below:

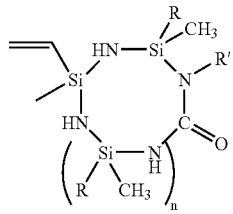

in which R and R' independently represent either a hydrogen atom or a vinyl group and n ranges from 1 to 20. Another preferred polysilazane is KiON™ VL20 whose structure is similar to that of CERASET™ SN but lacks the urea functionalities. These polymers are available from commercial suppliers such as Commodore Polymer Technologies (Columbus, Ohio, USA).

Prior to pyrolysis, the liquid polyorganosilazanes are preferably crosslinked, which can be achieved by exposure to heat in an inert atmosphere such as nitrogen or argon, such as for example at a temperature of 200–400° C. for a short period of time such as 15 minutes to 40 minutes. Further crosslinking, if desired, can be achieved by heating to higher temperature in the presence of a free radical generator such as a peroxide. The crosslinked polymer is then reduced to powder form by conventional comminution means such as a simple grinding, ball milling, planetary milling or the like. The powder is then pyrolyzed by heating to a temperature of 1,300° C. to 1,500° C. for about 0.5 hour to 6 hours, again in an inert atmosphere. The pyrolyzed powder is then subjected to mechanical activation, which is described below.

Regardless of how the powder mixture is obtained, the relative amounts of silicon, carbon, and nitrogen in the powder mixture can vary, although some variation in properties may result as the proportion of any one element is raised or lowered. For the purposes of this invention, best results will be obtained when the relative amounts are about 10 to about 60 parts by volume silicon, about 10 to about 60 parts by volume carbon, and about 10 to about 60 parts by volume nitrogen, based on a total of 100 parts by volume of the powder mixture. Preferred ranges are about 10 to about 30 parts by volume silicon, from about 25 to about 50 parts by volume carbon, and from about 25 to about 50 parts by volume nitrogen, again based on a total of 100 parts by volume of the powder mixture. The volumes used in determining these parts by volume are calculated from the weight percents of the individual elements and their theoretical densities.

The amorphous powder mixture is mechanically activated by high-energy ball milling. This is likewise achieved by methods known in the art and is typically performed in centrifugal or planetary mills that apply centrifugal and/or planetary action to the powder mixture with the assistance of grinding balls. The powder in these mills is ground to the desired size by impacts of up to 20 g (20 times the acceleration due to gravity). Variables such as the sizes of the milling balls, the number of milling balls used per unit amount of powder, the temperature at which the milling is performed, the length of time that milling is continued, and the energy level of the mill such as the rotational speed or the frequency of impacts, can vary widely. The number and size of the milling balls relative to the amount of powder is typically expressed as the "charge ratio," which is defined as the ratio of the mass of the milling balls to the mass of the powder. A charge ratio of about 1:1 or greater, preferably about 1:1 to about 10:1, and most preferably about 1:1 to about 5:1, will generally provide the best results. A charge ratio of at least about 10, and preferably from about 10 to about 20, can also be used. Preferred milling frequencies are at last about 3, and preferably about 3 to 30 cycles per second or, assuming two impacts per cycle, at least about 6 or preferably about 6 to about 60 impacts per second. A presently preferred frequency is about 20 impacts per second.

The particles of the powder mixture subsequent to milling are preferably in the micron-sized range. A preferred average particle size range is 1 to 10 microns, and a more preferred range is 1 to 5 microns.

Electric field-assisted sintering, also known as spark plasma sintering, is performed by passing a pulsewise DC electric current through the powder mixture while pressure is applied. A description of this method and of apparatus in which the method can be applied is presented by Wang, S. W., et al., "Densification of Al$_2$O$_3$ powder using spark plasma sintering," J. Mater. Res. 15(4), 982–987 (2000), such description being incorporated herein by reference. While the conditions may vary, best results will generally be obtained with a densification pressure exceeding 10 MPa, preferably of from about 10 MPa to about 200 MPa, and most preferably from about 40 MPa to about 100 MPa. Likewise, the preferred current is a pulsed DC electric current of from about 1,000 A to about 10,000 A, most preferably from about 1,500 A to about 5,000 A. Preferred temperatures are within the range of from about 1,000° C. to about 2,200° C., and most preferably from about 1,400° C. to about 1,800° C. Densification is typically performed by uniaxial compression under vacuum, and preferred vacuum levels for the densification are below 10 Torr, and most preferably below 1 Torr.

Sintering of the powder mixture consolidates the powder and converts amorphous particles in the powder mixture to crystalline grains in the nano-sized range. As noted above, the term "nano" is used herein to denote dimensions that are less than 100 μm. Preferred grain sizes in the sintered product are less than 50 nm in diameter, and particularly preferred average particle sizes are within the range of about 1 to about 20 nm in diameter. In some cases, grain growth occurs during sintering, resulting in composites with grain sizes that approach the upper limit of the nano size range and even exceed that limit. In general, however, if the procedural steps are performed as described herein, the final densified composite will demonstrate the desirable properties sought by this invention.

The benefits of the invention will be most evident when the composite is densified to a degree that approaches full theoretical density, which is the density of the material as determined by volume averaging the densities of each of its components. A density of at least 95% of the theoretical density is sought, preferably at least 98%, and most preferably at least 99%. The term "relative density" is used herein to denote the actual density expressed as a percent of the theoretical density.

The beneficial properties of the composites of this invention result from the combination of particle size, mechanical activation, and electric field-assisted sintering. These beneficial properties allow the composite to be prepared with little or no metal oxide densification aids, but in its broadest sense, the invention does not entirely preclude the inclusion of these densification aids. In the preferred practice of this invention, however, the maximum amount of metal oxide densification aids in the powder mixture is 1% by weight, more preferably 0.5% by weight, and still more preferably 0.1% by weight. Most preferably, the powder mixture is devoid of metal oxides serving as densification aids.

The following example is offered for purposes of illustration and is not intended to limit the scope of the invention.

EXAMPLE

The polyureasilazane CERASET SN, obtained from Commodore Polymer Technologies (Columbus, Ohio, USA) was crosslinked with 0.5–2 weight percent peroxide catalyst by heating at 200–300° C. for two hours in an argon atmosphere. The crosslinked polymer was then pulverized by ball milling for 24 hours in a nitrogen atmosphere to produced a powder of 200 mesh particle size (74 microns). The powders were then pyrolyzed at 1450° C. for four hours in flowing nitrogen to produce amorphous silicon carbide/nitride powder. The powder had an N/C/Si ratio of 42/38/20 on a volumetric basis, and its amorphous character was confirmed by X-ray diffraction analysis.

A portion of the amorphous powder was placed directly in silicon nitride milling jars together with silicon nitride milling balls 14 mm in diameter, at a charge ratio of 1:1. The milling jars were placed on high energy ball milling equipment: SPEX 8000 Mixer/Mill manufactured by SPEX CertiPrep Industries Inc., Metuchen, N.J., USA, and milling was performed over a period of 24 hours. The resulting powder consisted of particles of approximately 1 to 10 microns in diameter. In parallel manner, other portions of the amorphous powder were mixed with yttria powder at yttria weight percents of 1%, 3%, 5%, and 8%, and placed in similar milling jars with milling balls of the same composition at the same charge ratio, and milled under the same conditions.

The milled powders were then individually sintered by electric field-assisted sintering, using Dr. Sinter 1050 spark plasma sintering system (Sumitomo Coal Company, Japan) in vacuum. The samples were about 4.8 g in weight, and sintering was conducted using 18 kN (63 MPa) of uniaxial force and an electric square wave pulse cycle of 12 cycles on and 2 cycles off with a cycle time of about 3 ms. During the sintering cycle, the samples were heated to 600° C. in two minutes, and then heated at a rate of 100–200° C./min to 1,600° C. and held at that temperature for 10–30 minutes, as detected by an optical pyrometer focused at the outside of the graphite die.

The sintered compacts were removed from the sintering apparatus and their densities were determined by the Archimedes method using deionized water as the immersion medium. The densities for the 0%, 1%, 3%, 5%, and 8% yttria samples were 2.83, 2.96, 3.07, 3.09, and 3.02 g/cm$^3$, respectively, indicating that only a minimal loss in density resulted from the elimination of the yttria, and that this loss was most likely within error limits. In other tests, the crystalline phases present were determined by X-ray diffraction using CuKα radiation. The microstructure, i.e., the mapping of the elemental locations of the Si, C and N atoms, the phase distribution, and the grain sizes were determined by electron energy loss microscopy. Thus determined, the grain size for the 0% yttria sample was approximately 25 nm in diameter, and the grain size for the 1% yttria sample was approximately 38 nm in diameter. The grain boundaries, including the presence and absence of the inter-grain glassy phase, were analyzed by high resolution transmission microscopy.

Uniaxial constant stress compression creep tests were performed on computer-interfaced, pneumatic-load test frames at 1350–1450EC in air. The stress in these tests was applied in a stepwise manner, beginning by subjecting the sample to 50 MPa stress. When steady state (secondary creep, constant creep rate) was reached at this level, the stress was increased in 50 MPa steps and the secondary creep rate was measured at each stress level. This allows the steady-state creep rate vs. stress data to be obtained in a relatively short period of time. At the reference testing condition of 1400EC/100 MPa stress, the steady state creep rate of the nanocomposite with 1 weight % $Y_2O_3$ was about $1.67 \times 10^{-10} s^{-1}$, while the nanocomposite sintered without additive exhibited a creep rate as low as $6.3 \times 10^{-10} s^{-1}$ at 50 MPa. These are lower than any published creep rates for silicon nitride/silicon carbide composites at these stress and temperature levels. The microstructure of the nanocomposite was observed by TEM, which indicated an absence of pores. On this basis, the relative density of the nanocomposite was estimated to be 98% or greater.

The foregoing is offered for purposes of illustration and explanation. Further variations, modifications and substitutions that, even though not disclosed herein, still fall within the scope of the invention may readily occur to those skilled in the art.

What is claimed is:

1. A method for forming a dense composite of silicon nitride and silicon carbide, said method comprising:
   (a) mechanically activating a powder mixture of amorphous silicon nitride and silicon carbide in the presence of at most 1% by weight of metal oxide densification aids, said powder mixture consisting essentially of particles of about 1 nanometer to 100 nanometers in diameter; and
   (b) consolidating said powder mixture so activated into a continuous mass by compressing said powder mixture while passing an electric current through said powder mixture, to achieve a fused mass of silicon nitride and silicon carbide crystals.

2. The method of claim 1 in which said mechanically activated powder mixture resulting from step (a) consists essentially of particles of about 1 micron to about 10 microns in diameter, and said fused mass produced in step (b) consists essentially of crystalline grains less than 100 nm in diameter.

3. The method of claim 1 in which said mechanically activated powder mixture resulting from step (a) consists essentially of particles of about 1 micron to about 5 microns in diameter, and said fused mass produced in step (b) consists essentially of crystalline grains less than 50 nm in diameter.

4. The method of claim 1 in which any metal oxide densification aid present in said powder mixture constitutes at most about 0.5% by weight of said powder mixture of step (a).

5. The method of claim 1 in which any metal oxide densification aid present in said powder mixture of step (a) constitutes at most about 0.1% by weight of said powder mixture of step (a).

6. The method of claim 1 in which said powder mixture of step (a) is devoid of metal oxide densification aids.

7. The method of claim 1 further comprising forming said powder mixture of step (a) by pyrolysis of a polyorganosilazane in an inert atmosphere.

8. The method of claim 7 in which said polyorganosilazane is a polyureasilazane.

9. The method of claim 1 in which step (b) comprises compressing said powder mixture of step (a) at a pressure of about 10 MPa to about 200 MPa and a temperature of from about 900° C. to about 3,000° C., and said electric current is a pulsed direct current of about 1,000 A/cm$^2$ to about 10,000 A/cm$^2$.

10. The method of claim 9 in which said pressure is about 40 MPa to about 100 MPa.

11. The method of claim 9 in which said temperature is about 1,000° C. to about 2,000° C.

12. The method of claim 9 in which said pulsed direct current is about 1,500 A/cm$^2$ to about 5,000 A/cm$^2$.

13. The method of claim 1 in which step (a) comprises milling said powder mixture by high-energy ball milling.

* * * * *